US006949847B2

United States Patent
Tsutsumi et al.

(10) Patent No.: US 6,949,847 B2
(45) Date of Patent: Sep. 27, 2005

(54) ROTARY JOINT

(75) Inventors: Miki Tsutsumi, Hyogo (JP); Hitoshi Momoda, Hyogo (JP)

(73) Assignee: BL Autotec Ltd., Hyogo (JP)

( * ) Notice: Subject to any disclaimer, the term of this patent is extended or adjusted under 35 U.S.C. 154(b) by 0 days.

(21) Appl. No.: 10/470,768

(22) PCT Filed: Jan. 29, 2002

(86) PCT No.: PCT/JP02/00673
§ 371 (c)(1),
(2), (4) Date: Jul. 31, 2003

(87) PCT Pub. No.: WO02/060654
PCT Pub. Date: Aug. 8, 2002

(65) Prior Publication Data
US 2004/0067662 A1 Apr. 8, 2004

(30) Foreign Application Priority Data
Jan. 31, 2001 (JP) ........................................ 2001-023629

(51) Int. Cl.[7] ................................................ H02K 9/00
(52) U.S. Cl. .............................. 310/52; 310/59; 310/61; 310/58; 310/227; 310/232; 310/64; 431/13; 431/14; 431/15
(58) Field of Search ............................. 310/52, 59, 58, 310/227, 232, 64; 319/61; 431/13, 14, 15

(56) References Cited

U.S. PATENT DOCUMENTS

| | | | | |
|---|---|---|---|---|
| 4,294,500 A | * | 10/1981 | Wilson ........................ | 439/26 |
| 5,575,664 A | | 11/1996 | Sobhani | |
| 5,951,311 A | * | 9/1999 | Kato et al. ................. | 310/68 D |
| 6,089,875 A | | 7/2000 | Iwata et al. | |
| 6,114,783 A | * | 9/2000 | Asao .......................... | 310/58 |
| 6,140,722 A | * | 10/2000 | Ballard et al. .............. | 439/164 |

FOREIGN PATENT DOCUMENTS

| | | |
|---|---|---|
| JP | 5-138580 | 6/1993 |
| JP | 5-266957 | 10/1993 |
| JP | 10-094221 | 4/1998 |
| JP | 10-223346 | 8/1998 |
| JP | 2000-158376 | 6/2000 |

* cited by examiner

*Primary Examiner*—Darren Schuberg
*Assistant Examiner*—Iraj A. Mohandesi
(74) *Attorney, Agent, or Firm*—Nixon Peabody LLP

(57) ABSTRACT

In a rotary joint A including an electric signal slip ring 31 for passing different electric signals between a stator 1 and a rotor 6, for the purpose of stable transmission of electric signals in the electric signal slip ring 31, stationary side electrode stacks 38a and 38b are provided individually by stacking each pair of axially adjacent two 36b to 36e of six ring-plate-shaped stationary side electrodes 36a to 36f arranged concentrically with the axis of the stator 1 and aligned axially with each other together with one of stationary side insulating seats 37a and 37b interposed between the pair of axially faced stationary side electrodes, rotating side electrode stacks 42a to 42c are provided individually by stacking each pair of axially adjacent two 40a to 40f of six ring-plate-shaped rotating side electrodes 40a to 40f arranged concentrically with the axis of the rotor 6 and aligned axially with each other together with one of rotating side insulating seats 41a and 41c interposed between the pair of axially faced rotating side electrodes, a group of the stationary side electrode stacks 38a and 38b and another group of the rotating side electrode stacks 42a to 42c are arranged between the axially distally situated stationary side electrodes 36a and 36f so that one from one group and one from the other axially alternate and all in each group are axially aligned, and a plurality of spherical bodies 44 are disposed between each of the distally situated stationary side electrodes 36a and 36f and the electrode of the rotating side electrode stack 42a or 42c axially faced to each said distally situated stationary side electrode 36a or 36f and between the faced electrodes of the axially adjacent stationary and rotating side electrode stacks to roll on the faced electrodes to pass electric signals between them.

2 Claims, 12 Drawing Sheets

ROTARY JOINT

TECHNICAL FIELD

This invention relates to a rotary joint disposed, for example, at the distal end of a robot arm, and particularly relates to a technical field regarding measures for stably passing electric signals between a stator and a rotor.

BACKGROUND ART

Conventional rotary joints of this kind have a stator fixedly mounted to, for example, the distal end of a robot arm, and a rotor fixedly mounted to a hand side of the robot and rotatably coupled and supported to the stator, and are configured to allow communication of fluid, such as air, cooling water or welding gas, and electricity for power, signals or other purposes between the stator and rotor so that communication of such fluid and electricity can be established even when the hand side of the robot rotates with respect to the stationary side thereof.

Furthermore, for fluid communication, the above rotary joints employ a swivel joint in which plural kinds of fluid passages are arranged between the slide surfaces of the stator and rotor. For power electricity communication, the above rotary joints employ a slip ring consisting of a collector ring mounted to one of the stator and rotor and a slide contact mounted to the other for coming into sliding contact with the collector ring to feed electricity.

There are also known electric signal slip rings for passing electric signals between a stator and a rotor. Proposed as an example of such electric signal slip rings is, as disclosed in Japanese Unexamined Patent Publication No. 10-223346, an electric signal slip ring which includes a stationary side electrode of ring plate shape disposed on the stator side, a rotating side electrode of ring plate shape disposed on the rotor side, and a rolling element disposed between both the electrodes, and which is configured to roll the rolling element on both the electrodes by relative rotation of the rotor to the stator to pass electric signals between both the electrodes.

The proposed electric signal slip ring, however, has a problem that when a plurality of stationary side electrodes and a plurality of rotating side electrodes are arranged to pass different electric signals between the stator and rotor, some or other of the electrodes may produce sliding friction to make it difficult to stably transmit electric signals between the stator and rotor.

Furthermore, electric signal transmission through rolling of the rolling element on the electrodes, though making the occurrence of a slip of the rolling element difficult, cannot avoid the production of wear particles. When the wear particles accumulate on the conductive surfaces after long-time use, it again becomes difficult to stably transmit electric signals.

In addition, in order to ensure stable transmission of electric signals through rolling of the rolling element, it is desirable to reduce the sliding resistance of the rolling element as much as possible.

The present invention has been made in view of the foregoing points, and therefore its object is to improve the structure of the electric signal slip ring in the rotary joint as described above, thereby enabling, even in passing different electric signals between the stator and rotor, stable transmission of the electric signals.

DISCLOSURE OF INVENTION

To attain the above object, the present invention, as described above, is directed to a rotary joint including a stator, a rotor rotatably coupled and supported to the stator, and an electric signal slip ring for passing different electric signals between the stator and the rotor, wherein the electric signal slip ring includes a plurality of stationary side electrodes of ring plate shape arranged concentrically with the axis of the stator and aligned axially with each other, and a plurality of rotating side electrodes of ring plate shape arranged concentrically with the axis of the rotor and aligned axially with each other.

Furthermore, a stationary side electrode stack is provided by stacking each pair of axially adjacent two of the plurality of stationary side electrodes with a ring-shaped stationary side insulating layer interposed between the pair of two stationary side electrodes, and a rotating side electrode stack is provided by stacking each pair of axially adjacent two of the plurality of rotating side electrodes with a ring-shaped rotating side insulating layer interposed between the pair of two rotating side electrodes. In addition, the stationary side electrode stack and the rotating side electrode stack are axially alternately arranged between a pair of end electrodes located at both axial ends of the electric signal slip ring, and a plurality of rolling elements are disposed between each of the end electrodes and the electrode of the electrode stack axially faced to each said end electrode and between the axially faced electrodes of the axially adjacent electrode stacks to roll on said two electrodes through relative rotation of the rotor to the stator to pass electric signals between said two electrodes.

With this structure, a stationary side electrode stack is formed of one pair of the stationary side electrodes of the plurality thereof and the stationary side insulating layer, a rotating side electrode stack is formed of one pair of the rotating side electrodes of the plurality thereof and the rotating side insulating layer, these electrode stacks are axially alternately arranged between one pair of end electrodes located at both axial ends of the electric signal slip ring, and the plurality of rolling elements are disposed between each of the end electrodes and the electrode of the corresponding electrode stack and between the axially faced said electrodes of the axially adjacent said electrode stacks. Thus, while the rotary joint has a structure in which different electric signals are passed between the stator and the rotor, the rolling elements lie between each of the stationary side electrodes and the corresponding rotating side electrode for transmitting or receiving signals from or to each said stationary side electrode, and the stationary and rotating side electrodes relatively move while rolling the plurality of rolling elements. Therefore, the occurrence of slip on the electrodes is suppressed as much as possible, thereby providing stable transmission and reception of an electric signal between each of the stationary side electrodes and the corresponding rotating side electrode.

In the above rotary joint, pressing means for pressing at least one of the end electrodes towards the other end electrode may be provided. In this way, the occurrence of slip between each of the stationary side electrodes and the corresponding rotating side electrode can be suppressed with higher certainty, thereby providing more stable transmission and reception of an electric signal between both the electrodes.

In a rotary joint including a stator, a rotor rotatably coupled and supported to the stator, and an electric signal slip ring for passing electric signals between the stator and the rotor, an air blowing passage may be provided which has one end opening into the stator, the other end opening into the rotor and an intermediate part passing through the electric signal slip ring, and the rotary joint may be configured so that an air blowing operation of blowing air into the air blowing passage through one of an air blowing hole on the stator side and an air blowing hole on the rotor side while relatively rotating the stator and the rotor and discharging the air through the other air blowing hole and another air blowing operation of blowing air into the air blowing passage through the other air blowing hole while relatively rotating the stator and the rotor and discharging through said one air blowing hole is alternately carried out.

Alternately, in the rotary joint having the above inventive structure, an air blowing passage may be provided which has one end opening into the stator, the other end opening into the rotor and an intermediate part passing through the electric signal slip ring.

With these structures, even if wear particles are produced on the electric signal slip ring because of wear of the electrodes and so on, alternate air blows into the air blowing passage through each of its ends allow the air flow to blow off the wear particles through the other end of the air blowing passage together with the blown air. Therefore, wear particles can be removed with ease, thereby providing stable transmission of electric signals between the electrodes for a long period of time.

It is desirable that the air blowing passage should include an electric wire insertion hole for inserting therein an electric wire connecting to the electric signal slip ring. In this way, air can be blown on the electric signal slip ring using the existing electric wire insertion hole, and therefore the structure of the air blowing passage can be simplified.

In the rotary joint having the above inventive structure, the electric signal slip ring may include an outer housing fitted to one of the stator and the rotor, and an inner housing fitted to the other of the stator and the rotor and disposed substantially concentrically in the outer housing with an annular space created between the inner and outer housings, and the stationary and rotating side electrodes may be accommodated in the annular space between both the housings. Furthermore, one of the group of stationary side electrodes and the group of rotating side electrodes may be fitted and borne against the inner periphery of the outer housing with a certain clearance left between the inner peripheries of said one group of electrodes and the outer periphery of the inner housing, while the other of the group of stationary side electrodes or the group of rotating side electrodes may be fitted and borne against the outer periphery of the inner housing with a certain clearance left between the outer peripheries of said other group of electrodes and the inner periphery of the outer housing.

With this structure, even if the axes of the stator and rotor, i.e., the axes of the outer and inner housings of the electric signal slip ring, are misaligned relative to each other, the clearance between the inner peripheries of the electrodes fitted on the inner periphery of the outer housing and the outer periphery of the inner housing or the clearance between the outer peripheries of the electrodes fitted on the outer periphery of the inner housing and the inner periphery of the outer housing is only eliminated, which stably rolls the plurality of rolling elements between the electrodes. Therefore, even if a misalignment between the axes of the stator and the rotor occurs, it can be ensured that an electric signal is stably transmitted between the stationary and rotating side electrodes.

In this case, raceways for rolling elements of the stationary and rotating side electrodes may be formed in flat surfaces. Thus, the plurality of rolling elements can be rolled with higher stability between the electrodes. Therefore, even if a misalignment between the axes of the stator and the rotor occurs, it can be ensured that an electric signal is transmitted with higher stability.

The rolling elements and the electrodes in the electric signal slip ring may each have a plated surface. In this way, the contact resistance between each rolling element and the adjacent electrodes can be constantly held at a small value.

BEST MODE FOR CARRYING OUT THE INVENTION

A best mode for carrying out the present invention will be described as an embodiment with reference to the drawings.

Figure 11:
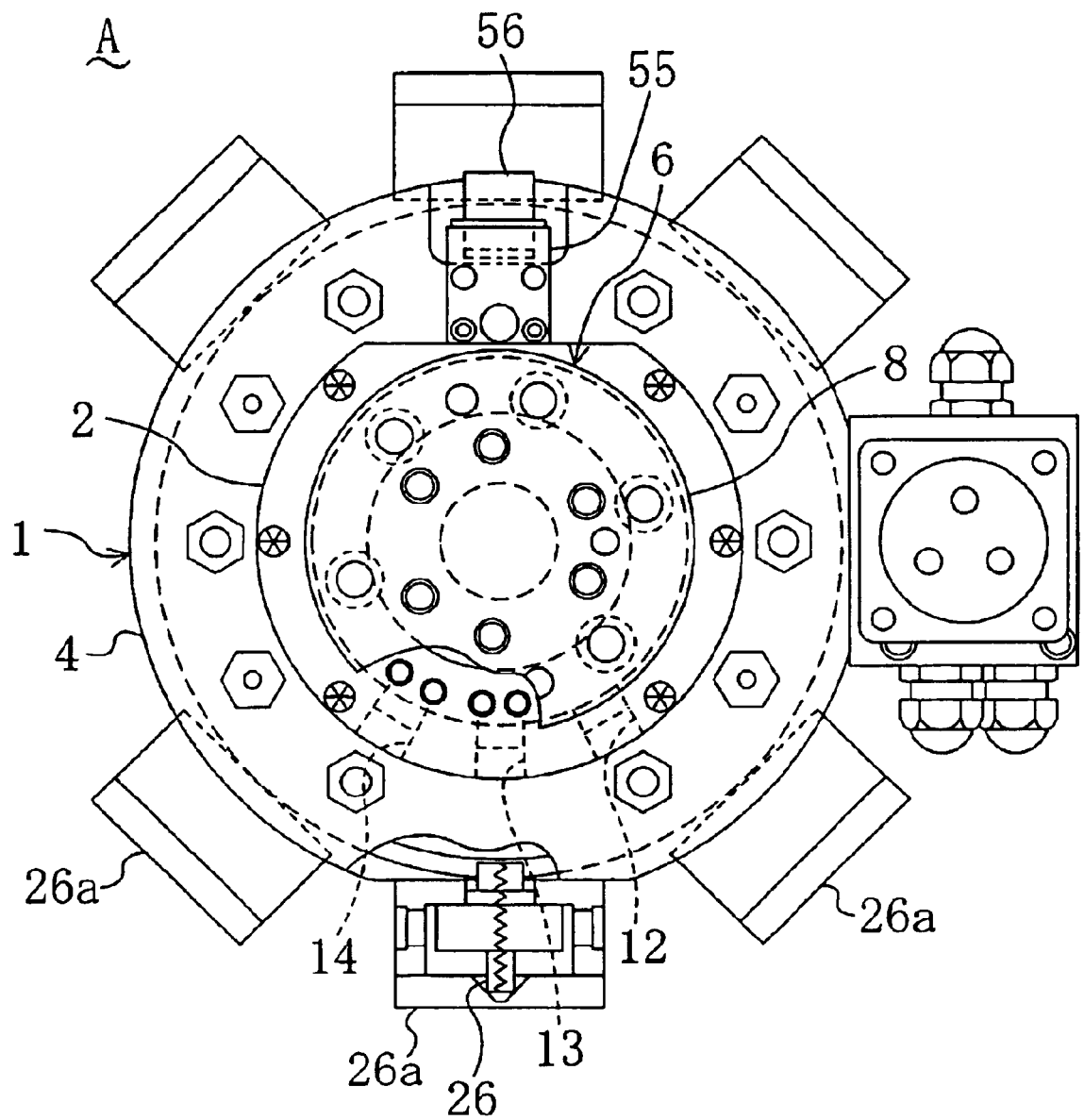
FIG. 11 is a top view of the rotary joint.
Figure 12:
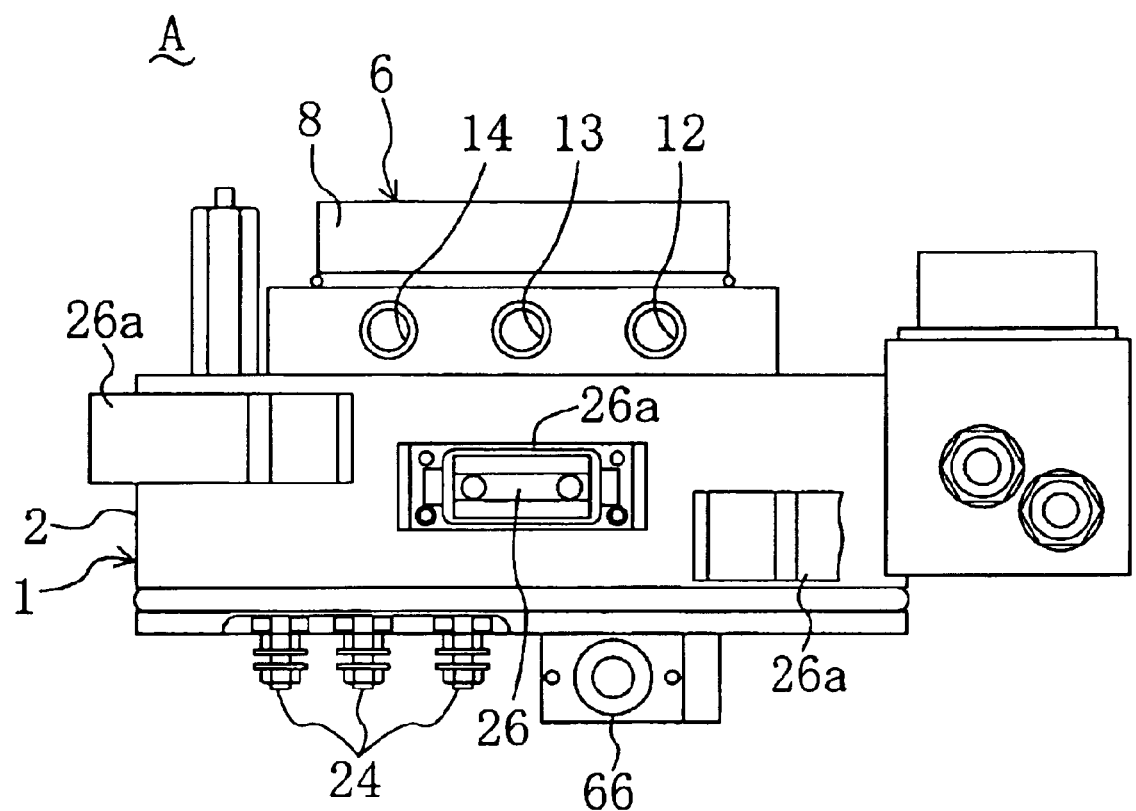
FIG. 12 is a front view of the rotary joint.
Figure 13:
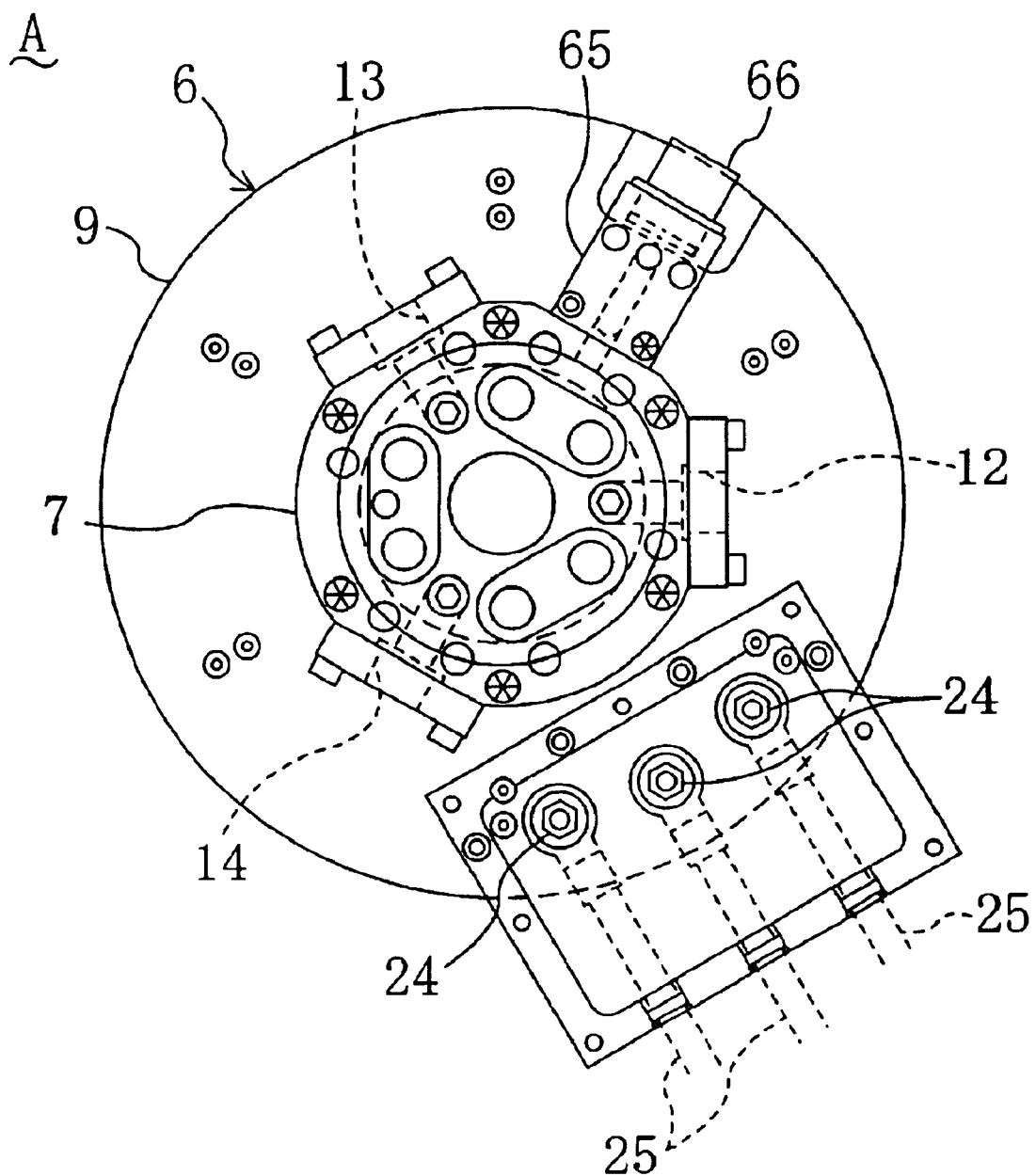
FIG. 13 is a bottom view of the rotary joint.

FIGS. 11 to 13 show a rotary joint A according to an embodiment of the present invention. This rotary joint A is arranged so as to be fitted to the distal end of an arm of an unshown welding robot for carrying out spot welding.

The rotary joint A includes a stator 1 of substantially cylindrical shape mounted to an arm side of the welding robot, and a rotor 6 of substantially cylindrical shape mounted to a welding gun side (a hand side) thereof. The rotor 6 is coupled and supported for rotation with 360 degrees or more to the stator 1.

Figure 1:
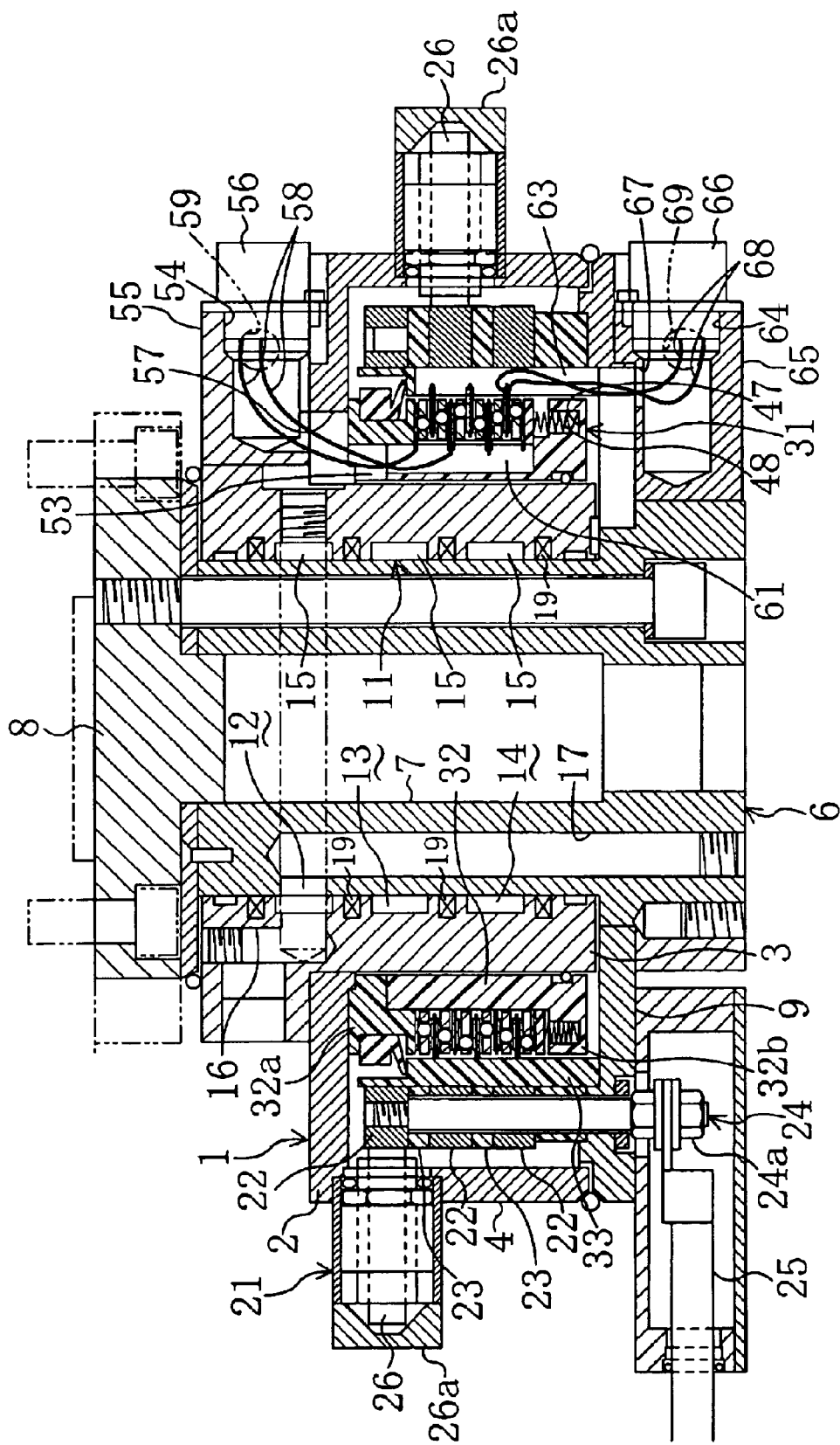
FIG. 1 is a cross-sectional view of a rotary joint according to an embodiment of the present invention.

As shown in enlarged manner in FIG. 1, the stator 1 has a cylindrical boss 3 formed integrally with an outward flange 2 at the top end (the upper end in FIG. 1), and a bottomed, cylindrical cover 4 that is disposed concentrically to surround the boss 3, is secured integrally to the boss 3 and downwardly opens.

The rotor 6 includes a cylindrical shaft 7 fitted relatively rotatably into the boss 3 of the stator 1, an upper flange 8 secured integrally on the upper end of the shaft 7 to close the opening of the cylindrical shaft 7 and located in a portion of the rotor 6 above the outward flange 2, and a lower flange 9 secured integrally about the lower end of the shaft 7 and extending radially outwardly beyond the bottom end of the boss 3 to close the lower opening of the cover 4.

Between the boss 3 of the stator 1 and the shaft 7 of the rotor 6, a swivel joint 11 is provided for communicating water and air as fluids between the stator 1 and the rotor 6. Furthermore, in a cylindrical space surrounded by the boss 3 and cover 4 of the stator 1 and the lower flange 9 of the rotor 6, a power slip ring 21 for supplying welding power from the stator 1 to the rotor 6, and an electric signal slip ring 31 located internally of the power slip ring 21 for passing different electric signals of plural kinds (six kinds in the example shown in the figures) between the stator 1 and the rotor 6 are fitted concentrically.

Figure 5:
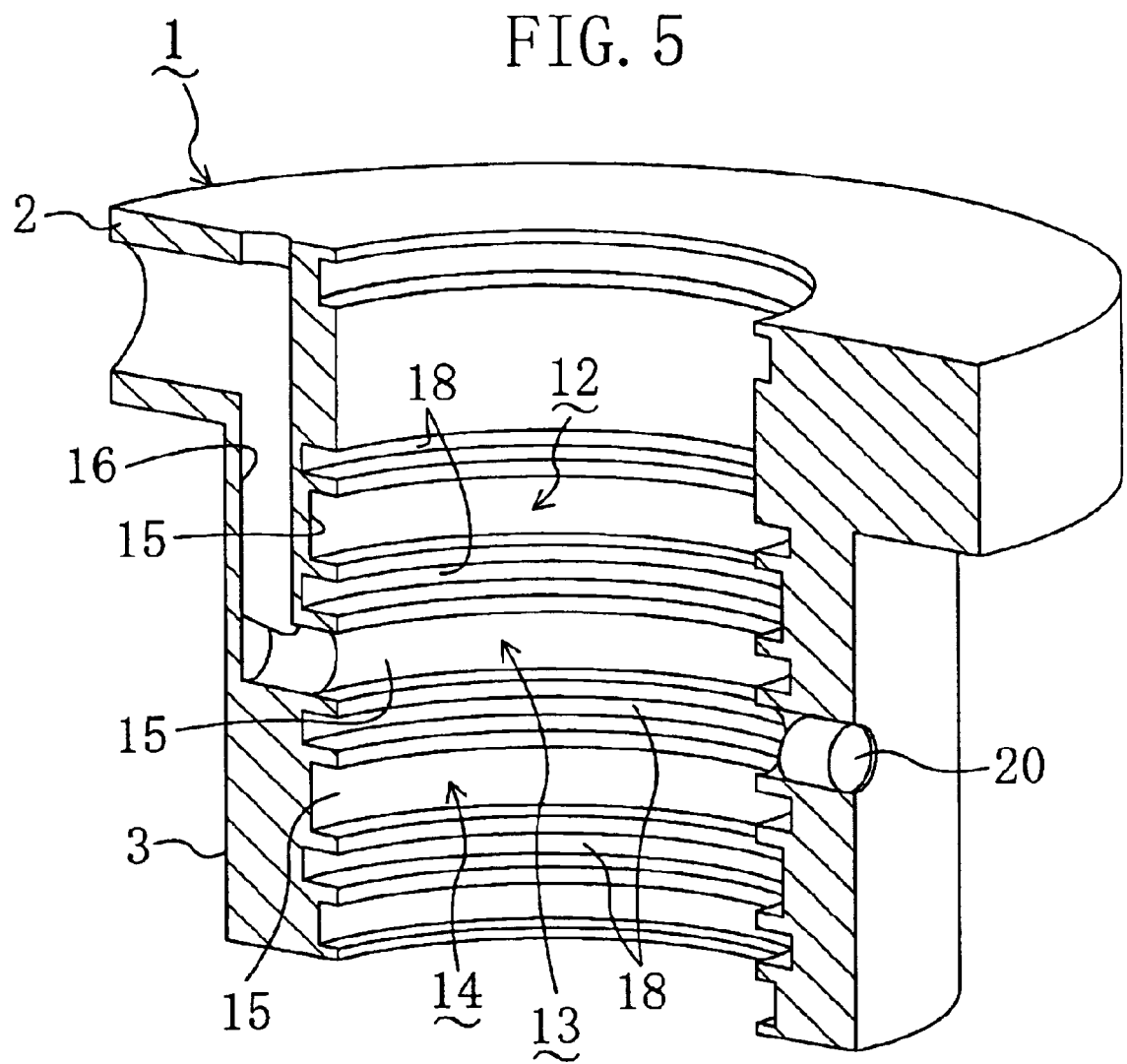
FIG. 5 is a partly-broken, perspective view showing portions of a boss of a stator which form water passages and an air passage, respectively.

The swivel joint 11 has two water passages 12, 13 and one air passage 14, and these three passages 12 to 14 have the same structure. Specifically, as also shown in FIG. 5, the internal periphery of the boss 3 of the stator 1 is formed with three annular grooves 15, 15, . . . vertically (axially) spaced from each other. Furthermore, inside of the wall of the boss 3, three vertical holes 16, 16, . . . (only part of them shown) extending vertically are formed through the wall and circumferentially close to each other. The lower end of each vertical hole 16 opens into the bottom surface of the corresponding annular groove 15, while its upper end opens into the outer periphery of the outward flange 2.

On the other hand, inside of the wall of the shaft 7 of the rotor 6, three vertical holes 17, 17, . . . (only part of them shown) extending vertically are formed through the wall at circumferentially equally spaced positions. The upper end of each vertical hole 17 opens into the outer periphery of the shaft 7 to communicate with the corresponding annular groove 15 in the boss 3 of the stator 1, while the lower end of each vertical hole 17 opens into the outer periphery of the shaft 7 below the lower flange 9. The passages including upper two of the three annular grooves 15, 15, . . . formed in the inner periphery of the boss 3 of the stator 1 constitute the water passages 12 and 13, respectively, and the passage including the lower one 15 constitutes the air passage 14. Through these water passages 12 and 13 and air passage 14, water and air can be communicated even between the stator 1 and the rotor 6 both relatively rotated.

Furthermore, the inner periphery of the boss 3 of the stator 1 is formed with four sealing grooves 18, 18, . . . one on each vertical (axial) side of the three annular grooves 15, 15, . . . , and each sealing groove 18 is fitted with a rubber-made sealing ring 19 so that the inner periphery of the sealing ring 19 makes sliding contact with the outer periphery of the shaft 7 of the rotor 6 to form a seal therewith.

Furthermore, as shown in FIG. 5, the opening of each vertical hole 16 in the bottom surface of the annular groove 15 in the boss 3 of the stator 1 is formed by perforating through the wall of the boss from the point on the outer periphery of the boss diametrically opposed to a portion to be opened of the bottom surface of the annular groove 15 and then making the opening in the bottom surface of the annular groove 15. The perforation of the wall is closed in air-tight manner by a plug 20 after the making of the opening.

The power slip ring 21 is provided with three collector rings 22, 22, . . . concentrically arranged in the cylindrical space formed among the boss 3 and the cover 4 of the stator 1 and the lower flange 9 of the rotor 6. The collector rings 22, 22, . . . are vertically stacked through individual insulating rings 23, 23, . . . . Each collector ring 22 is screwed on the distal end (upper end) of a collector bolt 24 that passes through the other collector rings 22 in electrically insulated manner. Each collector bolt 24 passes through the lower flange 9 of the rotor 6 in electrically insulated manner. Its head 24a at the lower end protrudes below the lower flange 9, and is connected with an end of a power cable 25 that conducts electricity to the welding gun (not shown).

Three slide contacts 26, 26, . . . pass through the sidewall of the cover 4 of the stator 1 at circumferentially equally spaced and mutually neighbouring positions in electrically insulated manner, and are secured to the sidewall of the cover 4 with each covered with a cover 26a. The inner end of each slide contact 26 is pushed slidably against the outer periphery of the corresponding collector ring 22 with a predetermined pressing force. The sliding contact between each slide contact 26 and the corresponding collector ring 22 allows welding power at a large current to be transmitted even between the stator 1 and the rotor 6 both relatively rotated.

Furthermore, the electric signal slip ring 31 is provided with a cylindrical inner housing 32 fitted onto the outer periphery of the boss 3 of the stator 1, and a cylindrical outer housing 33 fitted concentrically onto the inner housing 32 with an annular space 34 created therebetween as described later. Both the housings 32 and 33 are made of resin, for example. The outer periphery of the inner housing 32 is formed at the upper and lower ends integrally with outward flanges 32a and 32b, respectively. The annular space 34 of cylindrical shape is defined so as to be surrounded by both the flanges 32a and 32b, a vertical intermediate portion of the outer periphery of the inner housing 32, and the outer housing 33.

The annular space 34 between the inner and outer housing 32 and 33 accommodates six ring-plate-shaped stationary side electrodes 36a to 36f and six ring-plate-shaped rotating side electrodes 40a to 40f. Each of these electrodes 36a to 36f and 40a to 40f is made of phosphor bronze, for example, and its surface is plated with silver, for example. Preferably used as a plating material for this plating is any good conductive material having the effect of rust prevention of the electrodes 36a to 36f and 40a to 40f themselves. The thickness of the plated layer is preferably small. The plated layer with a thickness of 5 µm or less would be more preferable because it is less likely to be peeled off. The top and bottom surfaces of each of the electrodes 36a to 36f and 40a to 40f, specifically, their raceways on which the later-described spherical bodies 44 roll, are formed in flat surfaces.

Figure 2:
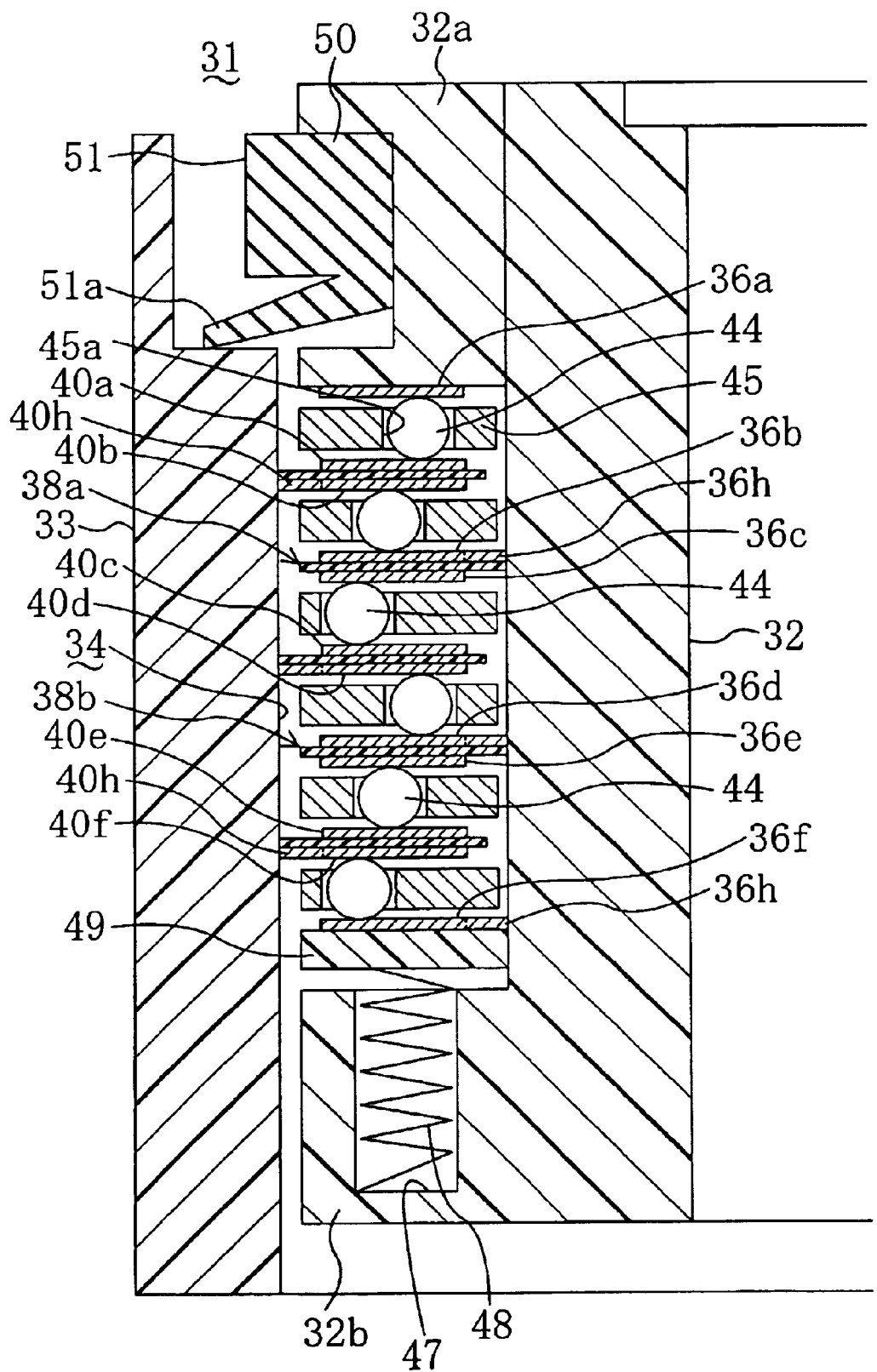
FIG. 2 is a cross-sectional view showing one side of an electric signal slip ring in enlarged manner.
Figure 3:
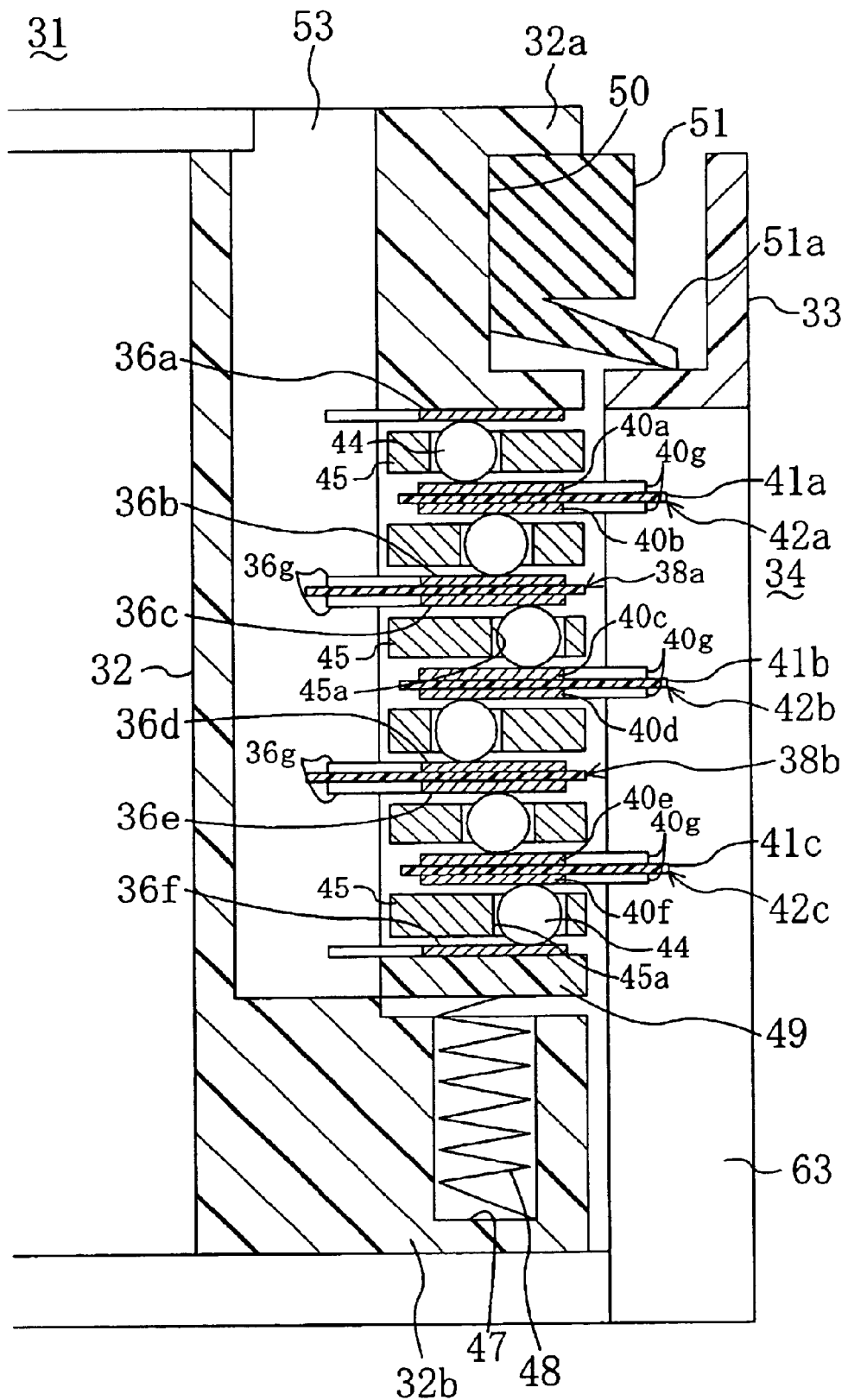
FIG. 3 is a cross-sectional view showing the other side of the electric signal slip ring in enlarged manner.

As shown in detail and enlarged manner in FIGS. 2 and 3, the six stationary side electrodes 36a to 36f are arranged concentrically with the axis of the stator 1 and aligned axially or vertically with each other, while the six rotating side electrodes 40a to 40f are likewise arranged concentrically with the axis of the rotor 6 and aligned axially or vertically with each other.

Figure 6:
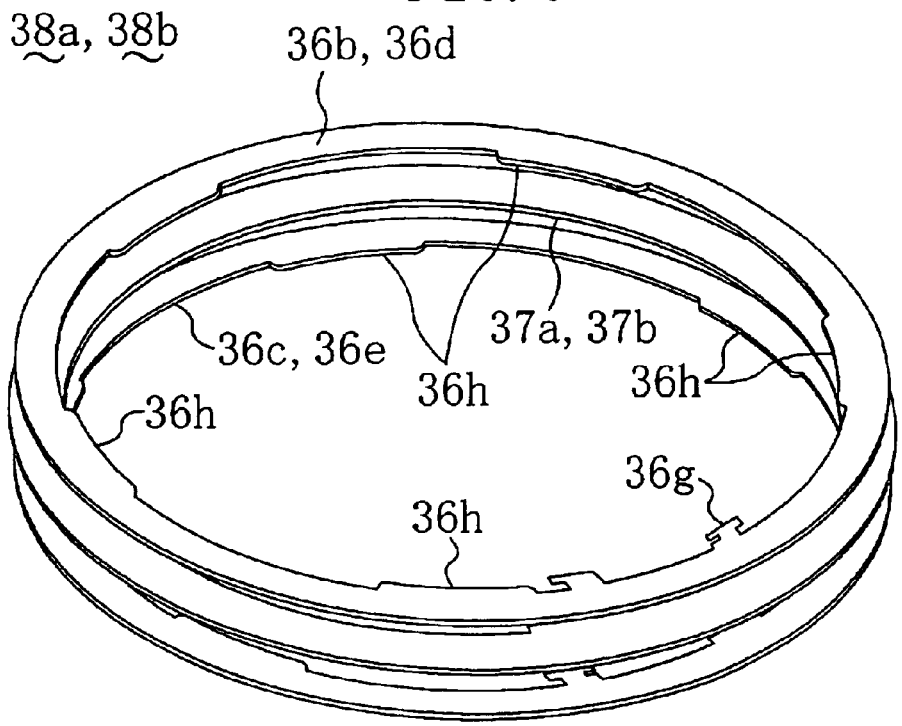
FIG. 6 is a perspective view showing the structure of a stationary electrode stack.

Among the six stationary side electrodes 36a to 36f, two electrodes 36a and 36f located at the upper and lower ends (axial ends) are end electrodes. For the four stationary side electrodes 36b to 36e exclusive of the two stationary side electrodes 36a and 36f as end electrodes, as also shown in FIG. 6, the one pair of axially adjacent stationary side electrodes 36b and 36c are stacked with a ring-shaped stationary side insulating seat 37a interposed therebetween, and the other pair of axially adjacent stationary side electrodes 36d and 36e are stacked with a ring-shaped stationary side insulating seat 37b interposed therebetween. The one pair of electrodes 36b and 36c and the other pair of electrodes 36d and 36e form two individual stationary side electrode stacks 38a and 38b with the stationary side insulating seats 37a and 37b, respectively.

Figure 7:
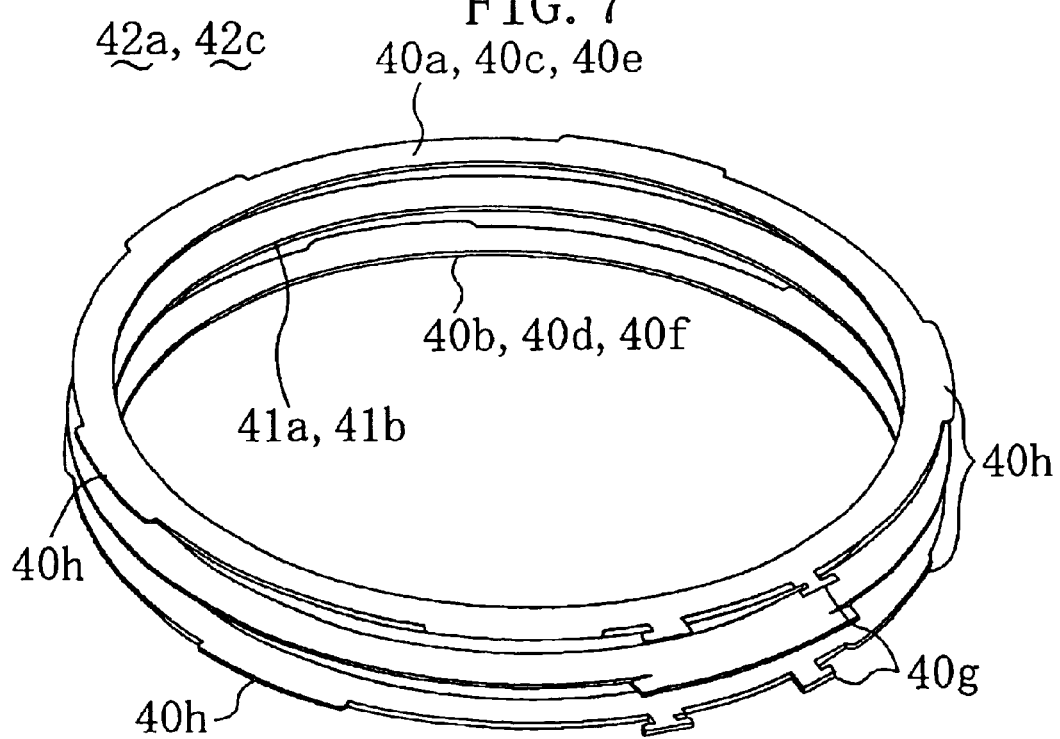
FIG. 7 is a perspective view showing the structure of a rotating electrode stack.

On the other hand, for the six rotating side electrodes 40a to 40f, as also shown in FIG. 7, the one pair of axially adjacent rotating side electrodes 40a and 40b are stacked with a ring-shaped rotating side insulating seat 41a interposed therebetween, the second pair of axially adjacent rotating side electrodes 40c and 40d are stacked with a ring-shaped rotating side insulating seat 41b interposed therebetween, and the third pair of axially adjacent rotating side electrodes 40e and 40f are stacked with a ring-shaped rotating side insulating seat 41c interposed therebetween. The one pair of electrodes 40a and 40b, the second pair of electrodes 40c and 40d, and the third pair of electrodes 40e and 40f form three individual rotating side electrode stacks 42a to 42c with the rotating side insulating seats 41a to 41c, respectively.

A group of the two stationary side electrode stacks 38a and 38b and another group of the three rotating side electrode stacks 42a to 42c are arranged between the stationary side electrodes 36a and 36f as a pair of end electrodes located at axial ends of the electric signal slip ring 31 so that one from one group and one from the other alternate axially or vertically and all in each group are axially aligned.

Figure 4:
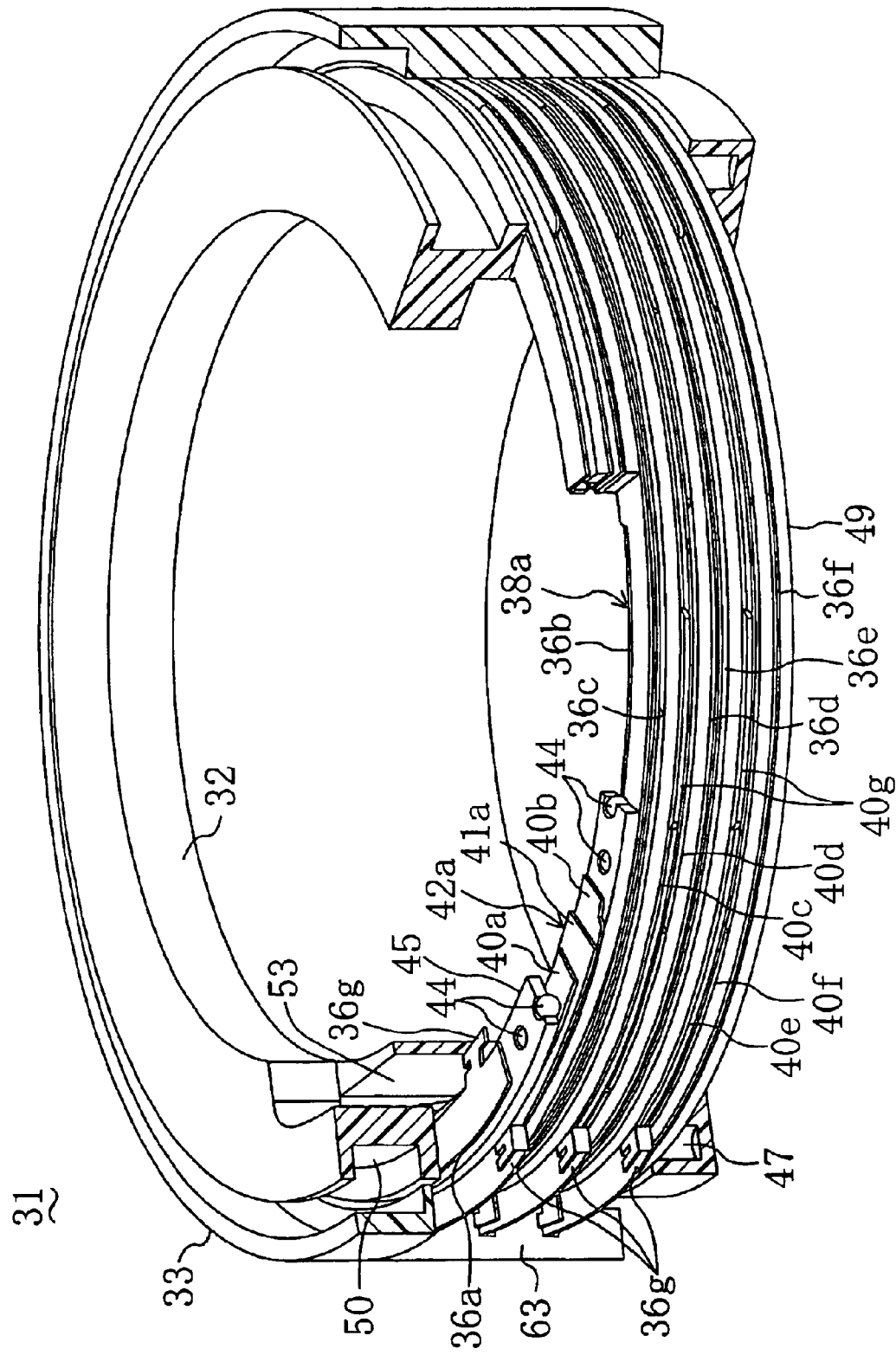
FIG. 4 is an enlarged perspective view showing the electric signal slip ring with portions broken away.

Furthermore, between each of the stationary side electrodes 36a and 36f as the end electrodes and an axially faced one of the rotating side electrodes 40a and 40f of the rotating side electrode stacks 42a and 42c, and between each faced two of the stationary and rotating side electrodes 36b to 36e and 40b to 40e of the axially adjacent stationary and rotating side electrode stacks 38a, 38b and 42a to 42c, spherical bodies 44 of steel balls are interposed which serve as rolling elements for rolling on each faced two of these electrodes 36a to 36f and 40a to 40f through rotation of the rotor 6 relative to the stator 1 to pass electric signals between the faced two of the electrodes 36a to 36f and 40a to 40f. As shown in FIG. 4, the plurality of spherical bodies 44 are disposed circumferentially at regular intervals between each faced two of the electrodes 36a to 36f and 40a to 40f. Each of the spherical bodies 44, 44, . . . is received and held in a corresponding one of retaining holes 45a in a ring-plate-shaped retainer 45 located between each faced two of the electrodes 36a to 36f and 40a to 40f. Each spherical body 44 is formed of, for example, a steel ball obtained by quenching carbon steel, and its surface is plated with silver, for example. Plating materials used for plating the spherical body 44 are desirably good conductive materials having the effect of rust prevention of the electrodes 36a to 36f and 40a to 40f themselves.

The lower flange 32b of the inner housing 32 is formed at the top surface with an annular spring groove 47, and the spring groove 47 accommodates a spring 48 as a pressing means for pressing the stationary side electrode 36f as the lower end electrode toward the stationary side electrode 36a as the upper end electrode. A ring-plate-shaped insulator 49 is interposed between the stationary side electrode 36f as the lower end electrode and the spring 48 so that the spring 48 presses the electrode 36f through the insulator 49.

The upper flange 32a of the inner housing 32 is formed at the outer periphery with an annular packing groove 50, and the packing groove 50 accommodates a rubber-made packing 51 of substantially V-shaped section having a lip 51a with the lip 51a pressing against the top surface of the outer housing 33. The packing 51 provides a seal between the upper ends of both the housings 32 and 33.

A portion of the inner housing 32 located toward the stator 1 is formed with a rectangular, bottomed hole 53 opening into the top surface of the inner housing 32. The outer periphery of the cover 4 of the stator 1 is mounted integrally with a connector fitting part 55 having a threaded hole 54, and a stationary side connector 56 is secured to the threaded hole 54 by screw-threaded engagement. The threaded hole 54 of the connector fitting part 55 is communicated with the bottomed hole 53 of the inner housing 32 via a through hole 57 formed in the cover 4. Furthermore, as also shown in FIG. 6, the inner peripheries of the stationary side electrodes 36a to 36f are provided with connection terminals 36g to extend to lie within the bottomed hole 53 of the inner housing 32, respectively. The connection terminals 36g are securely connected with one ends of stationary side electric wires 58, respectively. These six stationary side electric wires 58, 58, . . . run through the bottomed hole 53, the through hole 57 of the cover 4 and the threaded hole 54 of the connector fitting part 55, and are then connected at their other ends with the stationary side connector 56.

On the other hand, a portion of the outer housing 33 located toward the rotor 6 is formed at the outer periphery with a cutaway 63 formed by cutting away part of the outer housing 33 in a rectangular shape from the bottom surface. The outer periphery of the lower flange 9 of the rotor 6 is mounted integrally with a connector fitting part 65 having a threaded hole 64, and a rotating side connector 66 is secured to the threaded hole 64 by screw-threaded engagement. The threaded hole 64 is communicated with the cutaway 63 of the outer housing 33 via a through hole 67 formed in the lower flange 9. Furthermore, as also shown in FIG. 7, the outer peripheries of the rotating side electrodes 40a to 40f are provided with connection terminals 40g to extend to lie within the cutaway 63 of the outer housing 33, respectively. The connection terminals 40g are securely connected with one ends of rotating side electric wires 68, respectively. These six rotating side electric wires 68, 68, . . . run through the cutaway 63, the through hole 67 of the lower flange 9 and the threaded hole 64 of the connector fitting part 65, and are then connected at their other ends with the rotating side connector 66.

By conducting electricity between the individual stationary side electrodes 36a to 36f and the faced individual rotating side electrodes 40a to 40f via the spherical bodies 44, six kinds of electric signals are passed even between the stator 1 and the rotor 6 both relatively rotated, as shown in Table 1.

TABLE 1

| Signal | Stator side (Inner housing) | Spheric body | Rotor side (Outer housing) |
|---|---|---|---|
| 1 | Stationary side electrode 36a | | |
| | | 44 | |
| | | | Rotating side electrode 40a |
| | | | Rotating side insulating seat 41a |
| 2 | | | Rotating side electrode 40b |
| | | 44 | |
| | Stationary side electrode 36b | | |
| | Stationary side insulating seat 37a | | |
| 3 | Stationary side electrode 36c | | |
| | | 44 | |
| | | | Rotating side electrode 40c |

TABLE 1-continued

| Signal | Stator side (Inner housing) | Spheric body | Rotor side (Outer housing) |
|---|---|---|---|
| 4 | | | Rotating side insulating seat 41b |
| | | | Rotating side electrode 40d |
| | | 44 | |
| | Stationary side electrode 36d | | |
| | Stationary side insulating seat 37b | | |
| 5 | Stationary side electrode 36e | | |
| | | 44 | |
| | | | Rotating side electrode 40e |
| | | | Rotating side insulating seat 41c |
| 6 | | | Rotating side electrode 40f |
| | | 44 | |
| | Stationary side electrode 36f | | |

Furthermore, as shown in FIGS. 2, 3 and 6, the outer periphery of each of the stationary side electrodes 36a to 36f has a circular shape, while the inner periphery thereof is provided with a plurality of (five in the example shown) abutments 36h, 36h, . . . extending inwardly at positions circumferentially equally spaced from each other. The stationary side electrodes 36a to 36f are fitted and borne against the outer periphery of the inner housing 32 with the abutments 36h, 36h, . . . registering against it. A certain clearance is left between the outer peripheries of the stationary side electrodes 36a to 36f and the inner periphery of the outer housing 33.

On the other hand, as shown in FIGS. 2, 3 and 7, the inner periphery of each of the rotating side electrodes 40a to 40f has a circular shape, while the outer periphery thereof is provided with a plurality of (five in the example shown) abutments 40h, 40h, . . . extending outwardly at positions spaced circumferentially equally from each other. The rotating side electrodes 40a to 40f are fitted and borne against the inner periphery of the outer housing 33 with the abutments 40h, 40h, . . . registering against it. A certain clearance is left between the inner peripheries of the rotating side electrodes 40a to 40f and the outer periphery of the inner housing 32.

Furthermore, as shown in FIG. 1, the side surface of the connector fitting part 55 which is mounted on the outer periphery of the outward flange 2 of the stator 1 is formed with an air blowing hole 59 communicating with the threaded hole 54 inside thereof. The side surface of the connector fitting part 65 which is mounted on the outer periphery of the lower flange 9 of the rotor 6 is formed with an air blowing hole 69 communicating with the threaded hole 64 inside thereof. The air blowing hole 59 in the side surface of the connector fitting part 55 toward the stator 1, the threaded hole 54 inside thereof, the through hole 57 of the cover 4, the bottomed hole 53 of the inner housing 32 and the cutaway 63 of the outer housing 33 of the electric signal slip ring 31, the through hole 67 of the lower flange 9 of the rotor 6, the threaded hole 64 of the connector fitting part 65, and the air blowing hole 69 in the side surface thereof form an air blowing passage 61 one end of which opens into the stator 1 at the air blowing hole 59 in the connector fitting part 55 and the other end of which opens into the rotor 6 at the air blowing hole 69 in the connector fitting part 65. The intermediate zones of the air blowing passage 61 are in communication through the ways among the stationary side electrodes 36a to 36f and the rotating side electrodes 40a to 40f in the electric signal slip ring 31. For this purpose, the air blowing passage 61 is constituted by including the electric wire insertion holes for inserting therein the electric wires 58 and 68 connecting to the electric signal slip ring 31.

Figure 9:
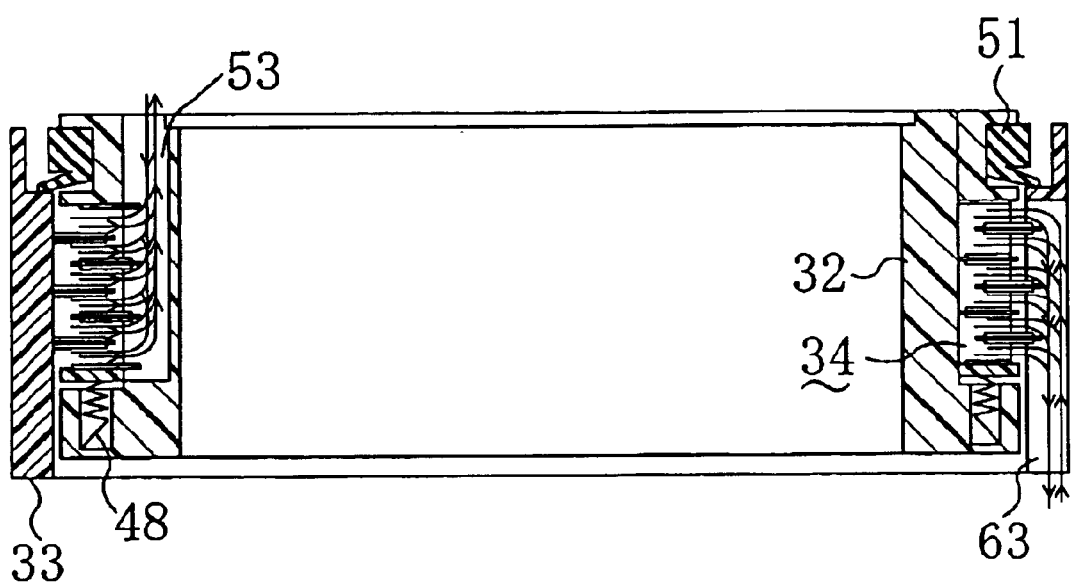
FIG. 9 is a cross-sectional view showing air flows when air is blown into the electric signal slip ring.
Figure 10:
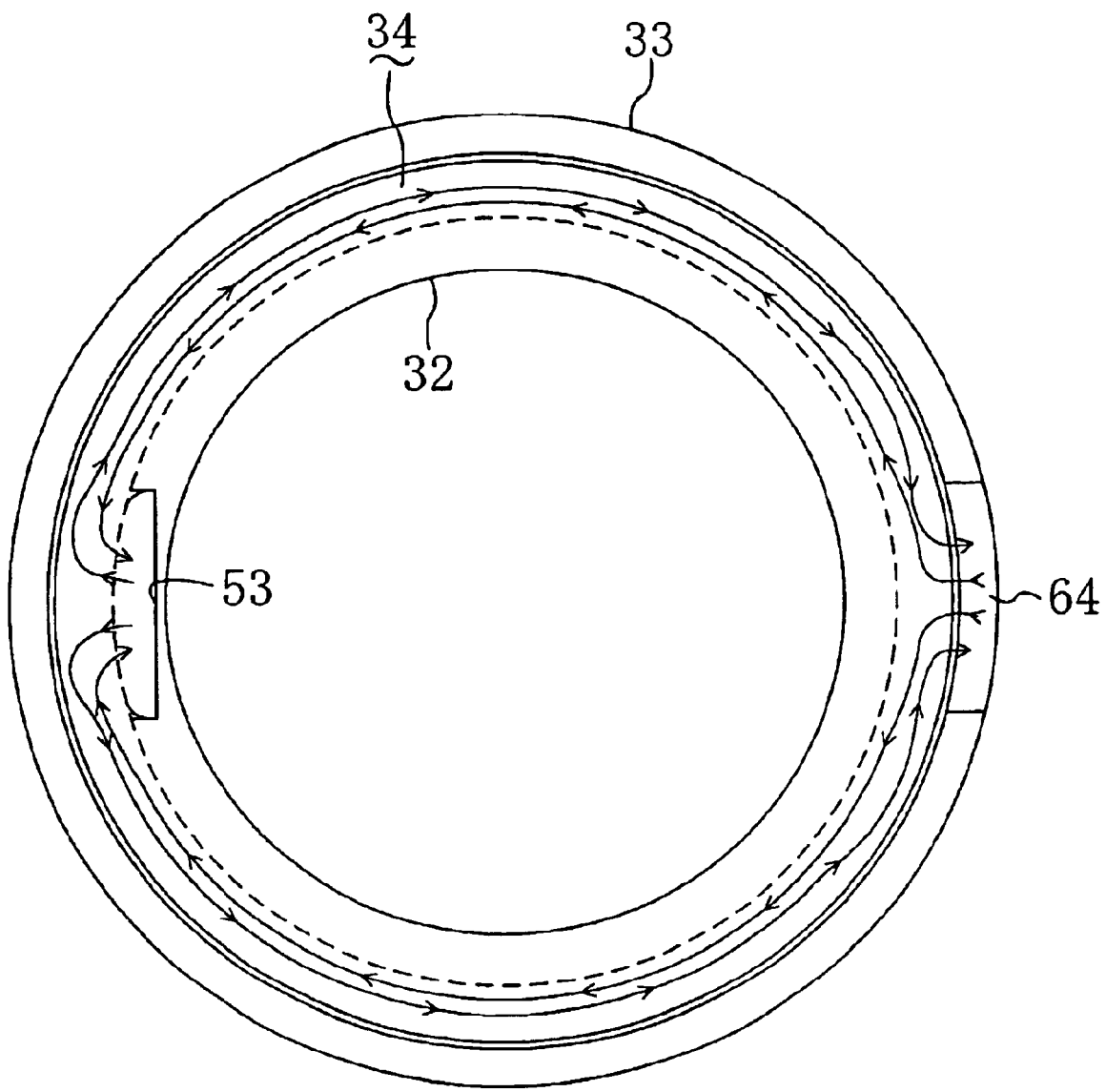
FIG. 10 is a plan view showing air flows when air is blown into the electric signal slip ring.

In this way, as shown in FIGS. 9 and 10, when compressed air is blown in through the air blowing hole 59 in the side surface of the connector fitting part 55 toward the stator 1 while the stator 1 and the rotor 6 are relatively rotated, the air is supplied to the bottomed hole 53 of the inner housing 32 of the electric signal slip ring 31 and split from the bottomed hole 53 into both circumferential sides, and these two split air flows are merged into a single flow at the cutaway 63 of the outer housing 33 and then blown out through the air blowing hole 69 in the side surface of the connector fitting part 65 of the rotor 6. On the contrary, when compressed air is blown in through the air blowing hole 69 in the side surface of the connector fitting part 65 toward the rotor 6, the air is run through the air blowing hole 61 in the reverse direction and blows out through the air blowing hole 59 in the side surface of the connector fitting part 55 toward the stator 1.

Therefore, according to this embodiment, when the rotor 6 is rotating relative to the stator 1 during operation of the welding robot for welding work with the welding gun, water and air are passed between the stator 1 and the rotor 6 through the two water passages 12 and 13 and the air passage 14 in the swivel joint 11. Furthermore, in the power slip ring 21, the slide contacts 26, 26, . . . on the stator 1 side comes into sliding contact with the collector rings 22, 22, . . . on the rotor 6 side, respectively, so that welding power at a large current is supplied from the stator 1 side to the rotor 6 side.

Furthermore, through the electric signal slip ring 31, six kinds of electric signals are passed between the stator 1 and the rotor 6. In this connection, in the electric signal slip ring 31, two stationary side electrode stacks 38a and 38b are formed individually by each pair of two of the four stationary side electrodes 36b to 36e excluding the end electrodes from the six stationary side electrodes 36a to 36f and one of the stationary side insulating seats 37a and 37b, and three rotating side electrode stacks 42a to 42c are formed individually by each pair of two of the six rotating side electrodes 40a to 40f and one of the rotating side insulating seats 41a to 41c. The electrode stacks 38a and 38b and the electrode stacks 42a to 42c are alternately arranged between the stationary side electrodes 36a and 36f which are the end electrodes. Between each of the stationary side electrodes 36a and 36f as the end electrodes and a corresponding one of the rotating side electrodes 40a and 40f of the rotating side electrode stacks 38a and 38b, and between each faced two of the stationary and rotating side electrodes 36b to 36e and 40b to 40e of the axially adjacent stationary and rotating side electrode stacks 38a, 38b and 42a to 42c, the plurality of spherical bodies 44, 44, . . . are interposed. Thus, the spherical bodies 44, 44, . . . lie between each of the stationary side electrodes 36a to 36f and a corresponding one of the rotating side electrodes 40a to 40f for transmitting or receiving signals from or to each said stationary side electrode, and the stationary side electrodes 36a to 36f and the rotating side electrodes 40a to 40f relatively move while rolling the spherical bodies 44, 44, . . . . In this way, the rotary joint has a structure in which six different electric signals are passed between the stator 1 and the rotor 6, and at the same time suppresses the occurrence of slip on the electrodes as much as possible. This provides stable transmission and reception of an electric signal between each of the stationary side electrodes 36a to 36f and the corresponding one of the rotating side electrodes 40a to 40f.

Furthermore, the stationary side electrode 36f as the lower end electrode is pressed toward the stationary side electrode 36a as the upper end electrode by the spring 48 so that the stationary side electrodes 36b to 36e and the rotating side electrodes 40a to 40f are sandwiched between the end electrodes (stationary side electrodes 36a and 36f) to press them against the spherical bodies 44, 44, . . . . Therefore, the occurrence of slip between each of the stationary side electrodes 36a to 36f and the corresponding one of the rotating side electrodes 40a to 40f can be suppressed with higher certainty, thereby providing more stable transmission reception of an electric signal between each of the electrodes 36a to 36f and the corresponding one of the electrodes 40a to 40f.

Furthermore, the surfaces of the spherical bodies 44, 44, . . . and the electrodes 36a to 36f and 40a to 40f are plated with silver or other materials. Therefore, the contact resistance between each spherical body 44 and the adjacent electrodes 36a to 36f and 40a to 40f can be constantly held at a small value.

Figure 8A:
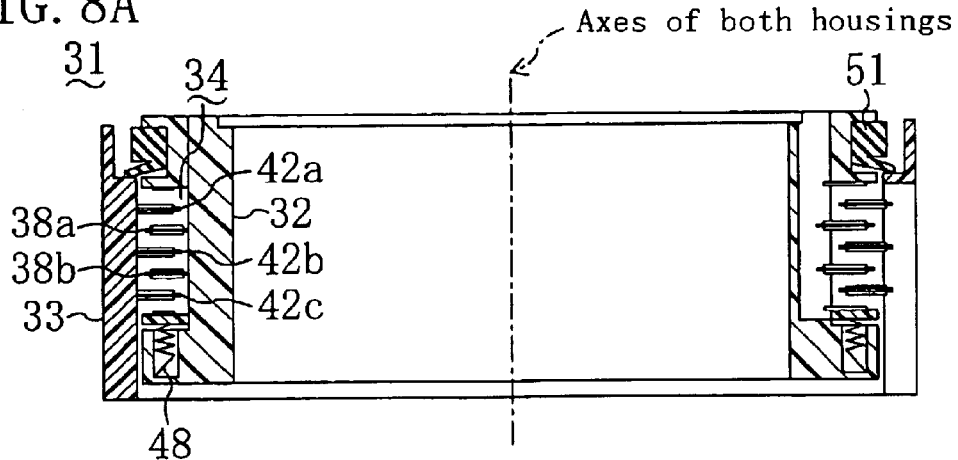
FIGS. 8A, 8B, and 8C are illustrations showing that the axes of housings of the electric signal slip ring are misaligned.
Figure 8B:
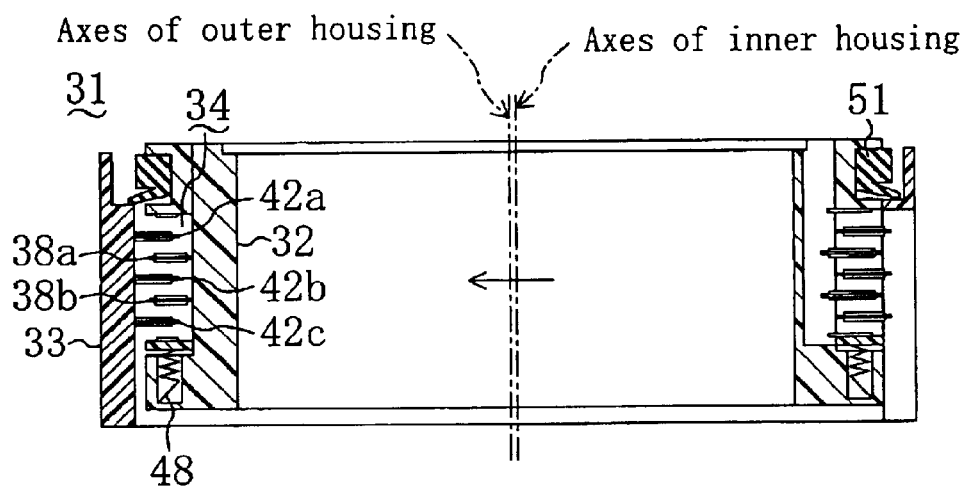
Figure 8C:
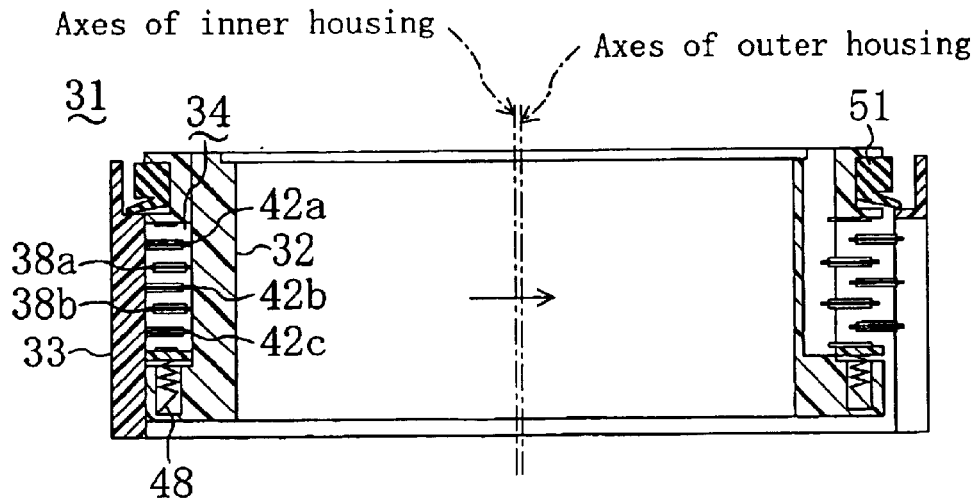

Moreover, the stationary side electrodes 36a to 36f are fitted and borne against the outer periphery of the inner housing 32 with the abutments 36h, 36h, . . . registering against it, and a certain clearance is left between the outer peripheries of the stationary side electrodes 36a to 36f and the inner periphery of the outer housing 33. On the other hand, the rotating side electrodes 40a to 40f are fitted and borne against the inner periphery of the outer housing 33 with the abutments 40h, 40h, . . . registering against it, and a certain clearance is left between the inner peripheries of the rotating side electrodes 40a to 40f and the outer periphery of the inner housing 32. Thus, even if the alignment of the axis of the outer housing 33 of the electric signal slip ring 31 with the axis of the inner housing 32 thereof, as shown in FIG. 8A, is disturbed during rotation of the rotor 6, for example, even if the axis of the outer housing 33 on the rotor 6 side is displaced, as shown in FIG. 8B, in one direction (leftwards in the figure) relative to the axis of the inner housing 32 on the stator 1 side, the inner peripheries of the rotating side electrodes 40a to 40f fitted on the inner periphery of the outer housing 33 only abut against the outer periphery of the inner housing 32 to eliminate the clearance therebetween. On the contrary, even if the axis of the outer housing 33 is displaced, as shown in FIG. 8C, in the other direction (rightwards in the figure) relative to the axis of the inner housing 32, the outer peripheries of the stationary side electrodes 36a to 36f fitted on the outer periphery of the inner housing 32 only abut against the inner periphery of the outer housing 33 to eliminate the clearance therebetween. Therefore, even if a misalignment between the axes of the stator 1 and the rotor 6 occurs, each spherical body 44 can be rolled stably between each faced two of the electrodes 36a to 36f and the electrodes 40a to 40f to ensure transmission of an electric signal therebetween.

In addition, since the raceways for spherical bodies 44 of the electrodes 36a to 36f and 40a to 40f are formed in flat surfaces, the plurality of spherical bodies 44, 44, . . . can be rolled with higher stability between each faced two of the electrodes 36a to 36f and the electrodes 40a to 40f. Therefore, even if a misalignment between the axes of the stator 1 and the rotor 6 occurs, it can be ensured that an electric signal is transmitted with higher stability.

Furthermore, the air blowing passage 61 is formed by the air blowing hole 59 in the side surface of the connector fitting part 55 toward the stator 1, the threaded hole 54 inside thereof, the through hole 57 of the cover 4, the bottomed hole 53 of the inner housing 32 and the cutaway 63 of the outer housing 33 of the electric signal slip ring 31, the through hole 67 of the lower flange 9 of the rotor 6, the threaded hole 64 of the connector fitting part 65, and the air blowing hole 69 in the side surface thereof. Therefore, as shown in FIGS. 9 and 10, there can be periodically carried out the operation of blowing compressed air into, for example, the air blowing hole 59 in the side surface of the connector fitting part 55 toward the stator 1 while relatively rotating the stator 1 and the rotor 6 (preferably, two turns or more), supplying the air into the bottomed hole 53 of the inner housing 32 of the electric signal slip ring 31 to split it from the bottomed hole 53 into both circumferential sides, merging both the air flows into a single flow at the cutaway 63 of the outer housing 33, and then blowing out the air flow through the air blowing hole 69 in the side surface of the connector fitting part 65 of the rotor 6, and subsequently the operation of blowing compressed air, in reverse, into the air blowing hole 69 in the side surface of the connector fitting part 65 of the rotor 6 while likewise relatively rotating the stator 1 and the rotor 6, running the air through the air blowing hole 61 in the reverse direction, and then blowing out the air through the air blowing hole 59 in the side surface of the connector fitting part 55 toward the stator 1 (these operations may be carried out in the reverse order). Thus, even if wear particles are produced on the electric signal slip ring 31 because of wear of the electrodes 36a to 36f and 40a to 40f, the air flow through the air blowing passage 61 can blow off the wear particles together with the blown air to the outside of the housings 32 and 33 (rotary joint A). Therefore, wear particles can be removed with ease, thereby providing stable transmission of electric signals between each faced two of the electrodes 36a to 36f and 40a to 40f for a long period of time.

Also, in this case, the air blowing passage 61 is constituted by including the electric wire insertion holes for inserting therein the electric wires 58 and 68 connecting to the electric signal slip ring 31. Thus, air can be blown on the electric signal slip ring 31 using the existing electric wire insertion holes, and therefore the structure of the air blowing passage 61 can be simplified. Alternatively, the air blowing passage 61 may be provided separately without using the existing electric wire insertion holes. However, the combination of the air blowing passage with the electric wire insertion holes as described above is desirable because its structure can be simplified.

INDUSTRIAL APPLICABILITY

According to the present invention, in a rotary joint including an electric signal slip ring for passing different electric signals between a stator and a rotor, a stationary side electrode stack is provided on the stator side by interposing a ring-shaped stationary side insulating layer between each pair of axially adjacent ring-plate-shaped stationary side electrodes, while a rotating side electrode stack is provided on the rotor side by interposing a ring-shaped rotating side insulating layer between each pair of axially adjacent ring-plate-shaped rotating side electrodes. The stationary side electrode stack and the rotating side electrode stack are axially alternately arranged between a pair of end electrodes located at both axial ends of the electric signal slip ring, and a plurality of rolling elements are disposed between the axially faced two of the electrodes, thereby passing electric signals between the faced electrodes. Therefore, the present invention has a high industrial applicability in that the occurrence of slip on the electrodes is suppressed as much as possible through the rolling of rolling elements between the faced electrodes, thereby providing stable transmission and reception of an electric signal between the faced stationary and rotating side electrodes and in turn improving the reliability of the rotary joint.

What is claimed is:

1. A rotary joint including a stator and a rotor rotatably coupled and supported to the stator, an annular space being formed between the stator and the rotor, and an electric signal slip ring provided in the annular space for passing electric signals between the stator and the rotor, the rotary joint characterized in that an air blowing passage is provided which has one end opening into the stator at a first air blowing hole, the other end opening into the rotor at a second air blowing hole, and an intermediate part passing through the annular space in which the electric signal slip ring is provided, and the rotary joint is configured to alternately carry out a first air blowing operation and a second air blowing operation to discharge wear particles produced by the electric signal slip ring to the exterior of the rotary joint, wherein in the first air blowing operation, air is blown into the air blowing passage through one of the first and second air blowing holes while relatively rotating the stator and the rotor, and the air is discharged through the other of the first and second air blowing holes, and wherein in the second air blowing operation, air is blown into the air blowing passage through the other of the first and second air blowing holes while relatively rotating the stator and the rotor, and the air is discharged through said one of the first and second air blowing holes so that direction of air blowing through the air blowing passage is reversed from the first air blowing operation.

2. A rotary joint including a stator, a rotor rotatably coupled and supported to the stator, and an electric slip ring for passing electric signals between the stator and the rotor, characterized in that an air blowing passage is provided which has one end opening into the stator at an air blowing hole, the other end opening into the rotor at an air blowing hole and an intermediate part passing through the electric signal slip ring, the air blowing passage including an electric wire insertion hole for inserting therein an electric wire connecting to the electric signal slip ring, and the rotary joint is configured so that an air blowing operation of blowing air into the air blowing passage through one of the air blowing hole on the stator side and the air blowing hole on the rotor side while relatively rotating the stator and the rotor and discharging the air through the other air blowing hole and another air blowing operation of blowing air into the air blowing passage through the other air blowing hole while relatively rotating the stator and the rotor and discharging through said one air blowing hole is alternately carried out.

* * * * *

UNITED STATES PATENT AND TRADEMARK OFFICE
CERTIFICATE OF CORRECTION

| | |
|---|---|
| PATENT NO. | : 6,949,847 B2 |
| APPLICATION NO. | : 10/470768 |
| DATED | : September 27, 2005 |
| INVENTOR(S) | : Mikio Tsutsumi et al. |

Page 1 of 1

It is certified that error appears in the above-identified patent and that said Letters Patent is hereby corrected as shown below:

Title page, item
(75)   Inventors: "Miki TSUTSUMI" should read --Mikio TSUTSUMI--.

Signed and Sealed this

Fifteenth Day of August, 2006

JON W. DUDAS
*Director of the United States Patent and Trademark Office*